United States Patent
Hernandez

(10) Patent No.: US 9,663,216 B2
(45) Date of Patent: May 30, 2017

(54) LOCKING CHANNEL LATCH

(71) Applicant: Andres Hernandez, Yorba Linda, CA (US)

(72) Inventor: Andres Hernandez, Yorba Linda, CA (US)

(73) Assignee: QRP, Inc., Leland, NC (US)

( * ) Notice: Subject to any disclaimer, the term of this patent is extended or adjusted under 35 U.S.C. 154(b) by 25 days.

(21) Appl. No.: 14/621,667

(22) Filed: Feb. 13, 2015

(65) Prior Publication Data
US 2016/0237724 A1 Aug. 18, 2016

(51) Int. Cl.
| | |
|---|---|
| *E05B 65/00* | (2006.01) |
| *E05C 3/04* | (2006.01) |
| *B64C 1/14* | (2006.01) |
| *E05B 41/00* | (2006.01) |
| *E05B 17/20* | (2006.01) |
| *B65D 45/34* | (2006.01) |

(52) U.S. Cl.
CPC ........ *B64C 1/1407* (2013.01); *E05B 17/2034* (2013.01); *E05B 41/00* (2013.01); *E05B 65/006* (2013.01); *E05C 3/048* (2013.01)

(58) Field of Classification Search
CPC .... E05C 3/122; E05C 19/26; E05C 2003/126; E05C 3/048; B64C 1/1407; E05B 41/00; E05B 17/2034; E05B 65/006; E05B 2001/0023; E05B 5/00; E05B 5/003; E05B 5/006; E05B 85/103; E05B 85/107; E05B 13/00; E05B 13/002; E05B 13/004; E05B 13/007
USPC ............. 292/202, 100, 113, 126, 200, 226, 292/256.69, DIG. 49, 205; 70/208, 210, 70/360, 361, 379 R, 379 A, 380
See application file for complete search history.

(56) References Cited

U.S. PATENT DOCUMENTS

| | | | | |
|---|---|---|---|---|
| 4,186,952 A | * | 2/1980 | Glass ...................... | E05C 3/042 292/202 |
| 4,325,239 A | * | 4/1982 | Larson ................ | E05B 19/0005 292/194 |
| 5,440,905 A | * | 8/1995 | Yamada .................. | E05B 5/003 292/202 |

(Continued)

FOREIGN PATENT DOCUMENTS

WO WO2009100030 8/2009

OTHER PUBLICATIONS

European Patent Office, European Search Report, Jul. 14, 2015, five (5) pages.

*Primary Examiner* — Kristina Fulton
*Assistant Examiner* — Faria Ahmad
(74) *Attorney, Agent, or Firm* — Ryder, Lu, Mazzeo & Konieczny LLC; Joseph M. Konieczny, Sr.; Gregory J. Gore

(57) ABSTRACT

A channel latch having a lock for holding the latch bolt closed which includes a secondary locking feature that prevents the lock from being turned. The lock mechanism has a tumbler barrel with a central reciprocal plunger that has a key portion which outwardly projects through the barrel into a keyway in the bolt. The plunger is depressed downward against a spring when a tool is inserted into the tumbler to turn it. The keyway includes longitudinal grooves and a pathway that restrict the upward release of the plunger only when the tumbler is turned to either the locked or unlocked position. Once the plunger is released the key and groove abutment prevents the lock from being turned.

18 Claims, 4 Drawing Sheets

(56) References Cited

U.S. PATENT DOCUMENTS

| | | | | |
|---|---|---|---|---|
| 5,450,734 | A | * | 9/1995 | Esaki ................. E05B 5/003 |
| | | | | 292/202 |
| 5,452,926 | A | * | 9/1995 | Takimoto ............ E05B 15/022 |
| | | | | 292/113 |
| 5,638,709 | A | | 6/1997 | Clavin |
| 6,314,772 | B1 | | 11/2001 | Hohlfelder |
| 6,953,209 | B2 | * | 10/2005 | Jackson, Jr. ........ E05B 17/0025 |
| | | | | 16/412 |
| 7,497,487 | B2 | * | 3/2009 | Burmahln ............ E05B 9/082 |
| | | | | 292/200 |
| 8,356,844 | B2 | | 1/2013 | Baic et al. |
| 8,544,900 | B2 | * | 10/2013 | Elbrecht ............... E05B 13/002 |
| | | | | 292/100 |
| 2009/0267360 | A1 | * | 10/2009 | Anderson ........... E05B 63/0056 |
| | | | | 292/202 |

\* cited by examiner

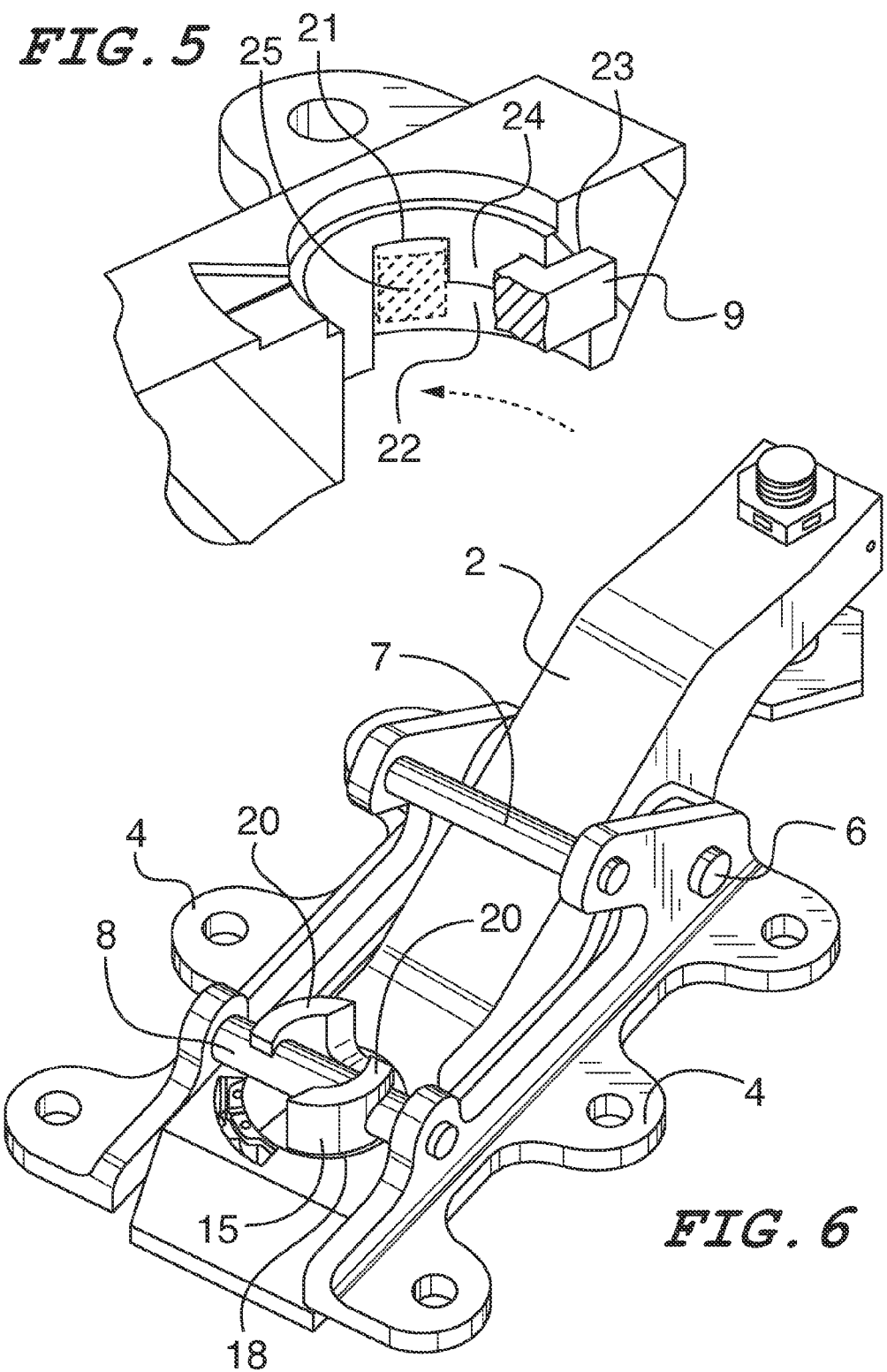

ial Appli- cation No. 61/940,465 entitled, "Locking Channel Latch" filed on Feb. 16, 2014, the contents of which are hereby incorporated by reference as if fully set forth herein.

LOCKING CHANNEL LATCH

CROSS-REFERENCE TO RELATED APPLICATION

This application claims benefit of U.S. Provisional Application No. 61/940,465 entitled, "Locking Channel Latch" filed on Feb. 16, 2014, the contents of which are hereby incorporated by reference as if fully set forth herein.

FIELD OF THE INVENTION

The present invention relates to a latch for holding a moveable door or panel in a fixed position relative to another structure. More specifically it relates to channel latches of the type used in conjunction with panels on the exterior of an aircraft.

BACKGROUND OF THE INVENTION

Aircraft utilize lever latches in many applications for retaining doors and access panels in their closed position. Latches utilized on the exterior of aircraft have aerodynamic requirements that necessitate flush mounting within the aircraft outer skin. To achieve this, the latching member or bolt is held within a recessed channel housing when it is in its closed condition, hence the name "channel latch."

Because of safety concerns and the serious nature of the equipment used in conjunction with these latches, there are requirements for ensuring that the latch bolt be locked down so that it does not inadvertently open due to vibration or shock that aircraft often experience. There is a further need for easily verifying that the lock-down mechanism is engaged. As an added measure of safety there is a need for a locking mechanism which requires a special tool to operate and which is vibration and shock avoidant.

There have been attempts to meet these needs in the art such as the latch described in U.S. Pat. No. 8,356,844 assigned to Avibank Manufacturing, Inc. entitled, "Flush Latch With Positive Lock". This patent describes an aircraft latch with a locking mechanism; however, the means to retain the device in the locked position is a spring which is subject to failure or could be overcome by severe shock. Also, because the locking means is biased in the locked position, it can become damaged if the latch is inadvertently closed. Furthermore the device disclosed in this document has a great multiplicity of parts with such complexity that could adversely affect reliability and maintenance.

There is therefore still a need in the art for a locking latch which provides a locking mechanism that avoids inadvertent damage and which provides a positive secondary locking means that cannot be overcome by shock or vibration. It is further desired that these needs be met with a device which is compact, light weight and which has a limited number of parts.

SUMMARY OF THE INVENTION

In order to meet one or more of the above-described needs in the art, the present channel lock invention has been devised. This channel latch utilizes a housing having panel attachment means and framework brackets at the sides, which define a recessed channel relative to the panel attachment means. A bolt is pivotally connected to the housing and is moveable between closed and open positions. The bolt substantially resides within the channel in the closed position. A lock mechanism secures the bolt closed. The bolt lock also includes a secondary locking device to hold the bolt lock in the locked position.

The locking device comprises an assembly including a lock tumbler that is closely fitted into the bolt near one end. A cylindrical bore through the bolt forms a cylinder that closely receives the tumbler assembly, which is rotatable between locked and unlocked positions. The bottom end of the tumbler barrel includes means for fixedly engaging the housing when in the locked position to hold the bolt closed.

The lock assembly also has a secondary safety feature that provides anti-rotation means to prevent the unwanted turning of the lock. It includes a reciprocal plunger that has an integral, radially extending key. The plunger rides up and down within a central longitudinal bore of the tumbler as it is released or depressed by a tool used to actuate the lock. A key portion of the plunger projects outwardly through a longitudinal slot in the side of the tumbler barrel. The end of the key is received in a keyway cut into the sidewall of the bolt cylinder that receives the tumbler. The keyway is continuous and includes three portions through which travel of the end of the key is restricted: an arcuate lateral cutaway portion at the bottom and two upwardly extending longitudinal grooves at either end of the lateral portion. The top ends of the two grooves define the fully released home positions of the key in either the locked or unlocked rotary positions of the tumbler barrel.

Tool engagement means for turning the lock assembly is provided by a hexagonal tumbler barrel bore which receives a corresponding tool. As the tool is inserted into the barrel bore the plunger is depressed downward. As explained above the plunger can only be released upwardly to a home position when the barrel is in either the locked or unlocked state. When released, the top of the plunger is flush with a top surface of the barrel. As an alternative the "unlocked" longitudinal groove can be shorter so that the top of the plunger is sub-flush in the unlocked home position providing an additional visual indicator of the bolt's unlocked state.

It is therefore one of the main objects of the invention to provide a locking channel latch with a secondary locking feature that will not be overcome by shock or vibration. It is another object to provide a locking latch which avoids damage and has only a few parts. These and other advantages will be apparent from the following drawings and description of the preferred embodiment. In this respect, before explaining at least one embodiment of the invention in detail, it is to be understood that the invention is not limited in its application or to the details of construction in the following description or illustrated in the drawings. The invention is capable of other embodiments and of being carried out in various ways.

BRIEF DESCRIPTION OF THE DRAWINGS

FIG. 5 is a sectional perspective view of the bolt bore and key.

FIG. 6 is a bottom right rear perspective view.

DESCRIPTION OF THE PREFERRED EMBODIMENT

Figure 1:
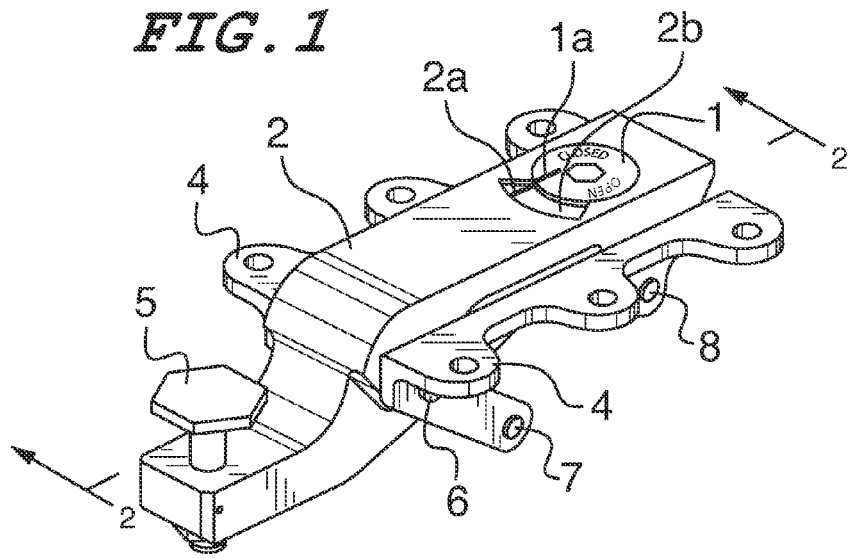
FIG. 1 is a top right front perspective view of the invention.

A latch in accordance with a preferred embodiment of the invention is shown in FIG. 1. The latch is fitted with a lock assembly 1 that secures the bolt 2 in its locked position relative to its housing 4. The housing 4 includes mounting brackets for affixing the latch assembly to a panel through the mounting holes shown. The bolt 2 lies within a channel formed between the brackets on each side. An adjustable interface screw 5 is located at the end of the bolt for abutment with an adjacent moveable panel or door to be secured (not shown). Indicia 1a and 2a, 2b on the top of the lock assembly visually indicate the rotational directions and the position of the lock.

Figure 2:
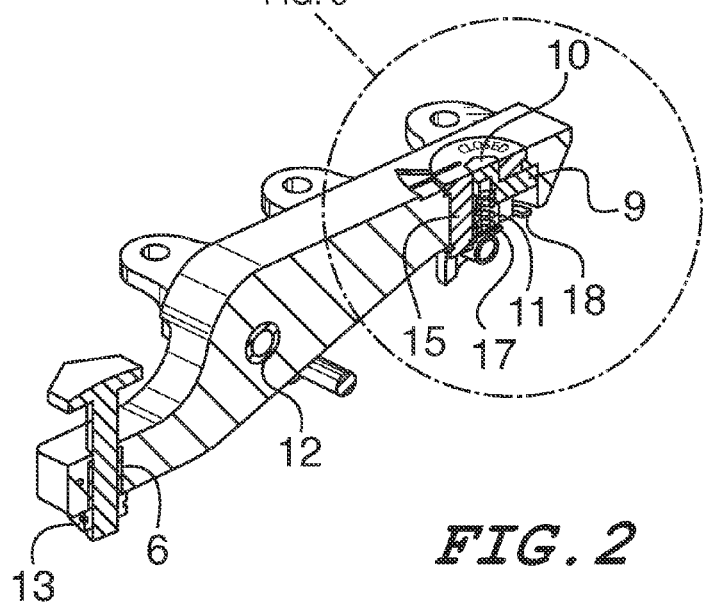
FIG. 2 is a sectional perspective view taken from FIG. 1 as shown in that Figure.

With reference now to FIG. 2, the bolt is pivotably affixed to the housing and is rotatable between open and closed positions. A tumbler barrel 15 constitutes the body of the lock assembly, which is fitted closely within a cylinder through the bolt near one end. The lock assembly includes a central plunger 10 biased upwardly by spring 11 supported by a spring clip 17 below. The lock assembly is captivated to the bolt between a flange at the top and by a retaining spring clip 18 at the bottom that engages the inside wall of the bolt cylinder. The plunger is captivated above by an outwardly projecting plunger key 9 that abuts the top edge of a slot in the sidewall of the tumbler barrel. These details of construction of the lock assembly are more clearly shown with regard to FIGS. 3 and 4.

Figure 3:
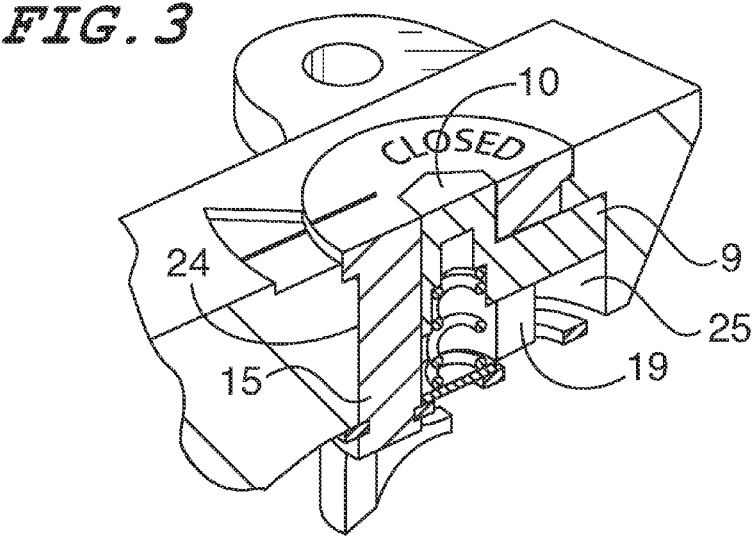
FIG. 3 is an enlarged sectional view taken from FIG. 2 showing the plunger of the lock assembly in the closed, extended position.
Figure 4:
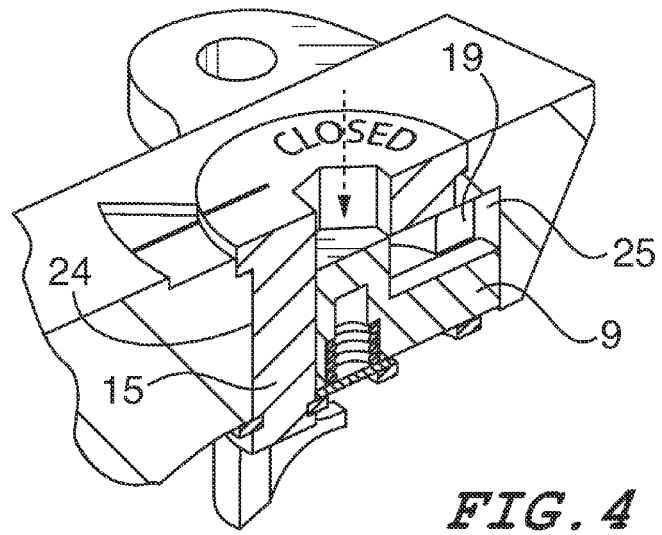
FIG. 4 is an enlarged sectional view similar to FIG. 3 but showing the plunger of the lock assembly in the closed, depressed position.

Referring now to FIGS. 3 and 4, the released and depressed positions of the plunger of the lock assembly are shown. In FIG. 3 the plunger is released, held upward by spring 16. The key 9 extends through a slot 19 in the tumbler barrel and projects outwardly into a keyway 25 of the bolt cylinder sidewall 24. The tumbler barrel includes a flange at the top which is recessed flush into the top of the bolt.

FIG. 4 is the same as FIG. 3 except that the plunger is shown depressed as it would be by a tool (not shown). The edges of the tumbler bore have a hexagonal lateral cross-section to mate with a hex wrench type tool used to turn the tumbler. With the plunger pressed downward as shown in this Figure the tip of the key 9 is now at the bottom of the keyway 25 ready for counter-clockwise rotation.

FIG. 5 depicts the path of the key in the bolt keyway. The boundaries of the keyway form a U-shaped pathway that consists of two upwardly extending longitudinal grooves approximately 90 radial degrees apart interconnected at the bottom by a lateral cutaway bounded at the bottom by the barrel retaining spring clip 18 shown in FIG. 2. In a first home position key 9 is shown upwardly released and resting in the longitudinal groove at the right. This represents the rotational locked position of the barrel, which is thus prevented from turning by the engagement between the tumbler barrel, the key, and the sides of the groove 23 in the bolt cylinder sidewall 24. Hooks 20 at the bottom end of the barrel are now engaged with the housing as seen in FIG. 6.

When a tool is inserted into the top of the tumbler barrel, the plunger is depressed downward moving the key to a position in the area of the lateral cutaway 22. The barrel is now free to turn. As the tumbler barrel is turned counter-clockwise, the key moves across the cutaway portion 22 until it is stopped by the end wall of the cutaway after 90 degrees of rotation. This point of tumbler barrel rotation corresponds to the disengagement of the barrel hooks with the housing. The tool is then withdrawn and the plunger spring returns it upward into the other longitudinal groove 21 released fully at the second home position 25. The tumbler barrel is then once again restricted against rotation and the locking assembly is now held in the unlocked position. Normally the top of the plunger would then be flush with the top of the barrel as shown in FIG. 3; however as an alternative the height of the unlocked groove can be made lower so that the released home position of the plunger leaves the top of the plunger sub-flush with the top of the barrel. This provides an additional visual indication that the bolt is unlocked.

Turning now to FIG. 6, the bottom of the latch is shown in the closed position with the bolt lock fully engaged with the housing by the capture of cross member 8 by hooks 20. The sides of the housing mounting brackets 4 are joined by cross members 6, 7 and 8, which include a roller rivet shown in FIG. 7 about which the bolt 2 can pivot when it is unlocked. Two opposing hooks 20 capture the housing cross-member 8 as the barrel 15 is turned to the locked position. Also shown in this Figure is spring clip 18 that holds the lock assembly to the bolt 2.

Figure 7:
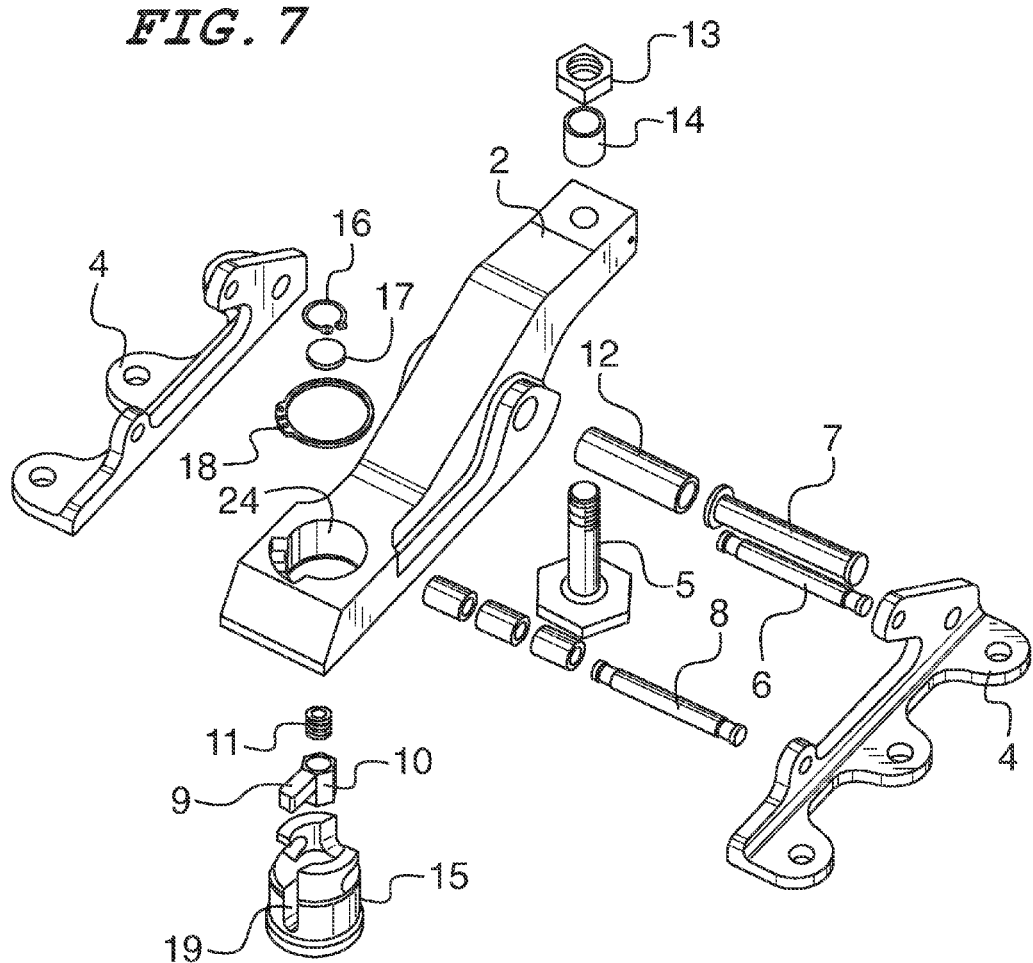
FIG. 7 is an assembly view taken from the perspective of FIG. 6.

FIG. 7 is an exploded assembly view which depicts the various components described above by like numbering. Brackets 4 form the latch housing and are joined by cross-members, rivets 6, 7 and 8. The bolt 2 pivots about roller 12 on rivet 7. The plunger 10 is installed into the lock subassembly from the bottom, retained by a clip 16, disc 17 and intermediate spring 11 which biases the plunger upward. The plunger is captivated at the top by the key portion 9 of the plunger 10 abutting the top end of the slot 19 in the side of the barrel 15. The barrel is secured within the bolt cylinder 24 by clip 18.

The reduced number of components of this embodiment greatly reduces the manufacturing cost, maintenance cost, and weight compared to some prior art latches. Conversely, the reduced number of components of this embodiment increases the latches reliability.

Operation of this embodiment of the invention proceeds as follows. Starting from the locked position, the bolt resides in the channel and is secured to the housing by engagement hooks at the bottom of the lock assembly. In this position, the anti-rotation key is captured at the top of the upwardly extending "locked" longitudinal keyway groove of the bolt so the lock assembly cannot turn. To unlock the bolt, a hex wrench is initially inserted into the top of the barrel and pushed downwardly to depress the barrel. This action forces the plunger key down the barrel slot and down the keyway groove until it abuts the lateral portion of the keyway. The tool can then be turned by rotating the barrel in the direction of the unlocked position. During that action the end of the key travels along the path of the lateral portion of the keyway until it abuts an end wall of the other longitudinal groove, which prevents any further rotation of the barrel in that direction. This position corresponds to the unlocked position where the hooks at the bottom end of the tumbler have disconnected from the housing. Withdrawing the tool allows the spring-biased plunger key to move upward into the "unlocked" longitudinal groove with which it is now aligned. The barrel is now once again secured against rotation. The bolt is thereby unlocked from the housing and now free to rotate out of the channel to release the panel or door it has secured. To lock the bolt after reclosing, the procedure is reversed.

It will be understood by those of skill in the mechanical arts that the objects and advantages of the invention have been achieved. For example after opening, the locking device holds the housing engagement hooks in the open position so that inadvertently banging the latch closed will not damage the hooks or the housing receiving member. Also, the lock retention key is only subject to movement in a direction perpendicular to the lock rotation in either of its home positions so that its lock retention effect will not be overcome by shock or vibration. Furthermore, these advantages have been achieved by a device having fewer parts than many prior art devices.

These and other advantages are provided by the invention, the disclosed embodiment being but one of its many possible variations. Also, it should be readily understood that the dimensions of the various components of the invention can be selected to operate as described above without limitation to the particular configuration, proportions and dimensions shown in drawings and described with regard to the preferred embodiment. As such the invention is to be defined only by the following claims and their legal equivalents.

I claim:

1. A locking latch, comprising:
   a housing;
   a bolt affixed to the housing rotatable between open and closed positions;
   lock means located within a cylinder in the bolt for locking the bolt in the closed position, said lock means comprising a tumbler having a top, a bottom, and a barrel portion closely fitted within said cylinder, said tumbler selectively rotatable between locked and unlocked positions;
   a plunger located within a longitudinal bore of said tumbler barrel, said plunger axially reciprocal within said bore between a depressed and a released home position;
   a radially extending key integral with said plunger;
   a longitudinal slot in the side of the tumbler barrel through which the plunger key outwardly projects;
   a keyway in a sidewall of the bolt cylinder into which said key extends which restricts movement of the key, wherein only upon a maximum depression of the plunger is the tumbler barrel free to rotate between the locked and unlocked positions;
   means for engaging said housing on a bottom portion of the tumbler to lock the bolt closed; and
   wherein said keyway comprises a bottom most lateral arcuate portion and first and second longitudinal upwardly extending grooves.

2. The latch of claim 1 wherein said housing includes a recessed channel which receives said bolt when it is closed.

3. The latch of claim 1 wherein said tumbler barrel bore includes tool-engaging means for turning the barrel.

4. The latch of claim 3 wherein said plunger lies flush with a top of the tumbler barrel when the bolt is locked and the plunger is in the released home position.

5. The latch of claim 1 wherein the means for engaging said housing comprises two hooks that capture a housing cross-member.

6. The latch of claim 4 further including indicia on the top of the tumbler barrel for visually indicating its position of rotation.

7. The latch of claim 1 wherein said plunger is upwardly biased toward the released position by a spring.

8. The latch of claim 1 wherein the tumbler barrel is affixed to the bolt by capture between a flange at the top of the tumbler barrel and a retaining spring clip which engages the bolt cylinder sidewall.

9. The latch of claim 1 wherein said housing comprises two opposing side brackets joined by cross-members.

10. The latch of claim 9 wherein the bolt lies between the two side brackets and is rotatable about a roller on a rivet that joins said brackets.

11. The latch of claim 10 wherein the brackets include means for attachment to a panel.

12. The latch of claim 1 wherein the height of the second groove is lower than the first groove such that when the key is fully released within the second groove the top of the plunger lies sub-flush with the top of the barrel.

13. The latch of claim 12 wherein said tumbler barrel bore has a lateral hexagonal cross-section.

14. The latch of claim 1 wherein the bolt is locked when the key occupies the first groove and the bolt is closed.

15. The latch of claim 14 wherein when the key occupies the second groove the bolt is unlocked.

16. A locking latch, comprising:
   a housing;
   a bolt affixed to the housing rotatable between open and closed positions;
   lock means located within a cylinder in the bolt for locking the bolt in the closed position, said lock means comprising a tumbler having a top, a bottom, and a barrel portion closely fitted within said cylinder, said tumbler selectively rotatable between locked and unlocked positions;
   a plunger located within a longitudinal bore of said tumbler barrel, said plunger axially reciprocal within said bore between a depressed and a released home position;
   a radially extending key integral with said plunger;
   a longitudinal slot in the side of the tumbler barrel through which the plunger key outwardly projects;
   a keyway in a sidewall of the bolt cylinder into which said key extends which restricts movement of the key, wherein only upon a maximum depression of the plunger is the tumbler barrel free to rotate between the locked and unlocked positions;
   means for engaging said housing on a bottom portion of the tumbler to lock the bolt closed; and
   wherein the means for engaging said housing comprises two hooks that capture a housing cross-member.

17. A locking latch, comprising:
   a housing;
   a bolt affixed to the housing rotatable between open and closed positions;
   lock means located within a cylinder in the bolt for locking the bolt in the closed position, said lock means comprising a tumbler having a top, a bottom, and a barrel portion closely fitted within said cylinder, said tumbler selectively rotatable between locked and unlocked positions;
   a plunger located within a longitudinal bore of said tumbler barrel, said plunger axially reciprocal within said bore between a depressed and a released home position;
   a radially extending key integral with said plunger;
   a longitudinal slot in the side of the tumbler barrel through which the plunger key outwardly projects;
   a keyway in a sidewall of the bolt cylinder into which said key extends which restricts movement of the key, wherein only upon a maximum depression of the plunger is the tumbler barrel free to rotate between the locked and unlocked positions;
   means for engaging said housing on a bottom portion of the tumbler to lock the bolt closed; and
   wherein said plunger is upwardly biased toward the released position by a spring.

18. A locking latch, comprising:

a housing;

a bolt affixed to the housing rotatable between open and closed positions;

lock means located within a cylinder in the bolt for locking the bolt in the closed position, said lock means comprising a tumbler having a top, a bottom, and a barrel portion closely fitted within said cylinder, said tumbler selectively rotatable between locked and unlocked positions;

a plunger located within a longitudinal bore of said tumbler barrel, said plunger axially reciprocal within said bore between a depressed and a released home position;

a radially extending key integral with said plunger;

a longitudinal slot in the side of the tumbler barrel through which the plunger key outwardly projects;

a keyway in a sidewall of the bolt cylinder into which said key extends which restricts movement of the key, wherein only upon a maximum depression of the plunger is the tumbler barrel free to rotate between the locked and unlocked positions;

means for engaging said housing on a bottom portion of the tumbler to lock the bolt closed; and wherein the tumbler barrel is affixed to the bolt by capture between a flange at the top of the tumbler barrel and a retaining spring clip which engages the bolt cylinder sidewall.

* * * * *